United States Patent [19]

Romagosa

[11] 4,453,213

[45] Jun. 5, 1984

[54] ERROR REPORTING SCHEME

[75] Inventor: Alfredo A. Romagosa, Ft. Lauderdale, Fla.

[73] Assignee: Harris Corporation, Melbourne, Fla.

[21] Appl. No.: 288,504

[22] Filed: Jul. 30, 1981

[51] Int. Cl.$^3$ ............................................. G06F 11/00
[52] U.S. Cl. ........................................ 364/200; 371/16
[58] Field of Search ............... 364/200, 900; 371/16, 371/18

[56] References Cited

U.S. PATENT DOCUMENTS

| 3,921,141 | 11/1975 | Wilber et al. | 364/200 |
|---|---|---|---|
| 4,228,496 | 10/1980 | Katzman et al. | 364/200 |
| 4,262,357 | 4/1981 | Shima | 364/200 |
| 4,263,649 | 4/1981 | Lapp | 364/200 |
| 4,320,452 | 3/1982 | Kempf et al. | 364/200 |
| 4,374,414 | 2/1983 | Comfort et al. | 364/200 |

FOREIGN PATENT DOCUMENTS 56-93496  7/1981  Japan ................................. 371/16

Primary Examiner—Jerry Smith
Assistant Examiner—Michael R. Fleming
Attorney, Agent, or Firm—Antonelli, Terry & Wands

[57] ABSTRACT

Errors occurring during data communications in a data processor communication network are routed by way of an arbitration module to a maintenance and processor. In the event of an error, the module which detects the error immediately terminates its present operation and, after gaining access to the communication bus, reports the error to the arbiter. In so doing, the error reporting module sets an error bit on an error signal line that forms part of the command bus. When the arbiter sees the error bit line set, it ignores the destination address produced by the logical-physical address table which identifies the other participant (destination module) in the transfer in which the error arose, and, instead, substitutes the physical address of the maintenance processor as the intended recipient of the transfer. When the maintenance processor sees it physical address line set, it can proceed to analyze the error report. Since the identities of the source and destination addresses of the participants in the transfer in which the error arose are defined by the contents of the source and destination portions of the address bus, the maintenance processor merely needs to read these buses to learn the location of each module participating in the error transfer.

14 Claims, 2 Drawing Figures

ERROR REPORTING SCHEME

FIELD OF THE INVENTION

The present invention relates to electronic data processing systems and particularly to a mechanism for reporting the occurrence of errors to a maintenance processor during system operation.

BACKGROUND OF THE INVENTION

One of the important aspects of present-day data processing systems is their capability of monitoring the operation of all units within the system and taking corrective action in the event of a fault or failure. Diagnostic testing and error-handling functions are typically assigned to a maintenance processor to which transmissions indicative of errors are directed in the event of a system or subsystem anomaly. Such error recovery schemes may include the monitoring of parity, time-out, bus and internal memory errors, error correcting codes, etc. For descriptions of examples of the use of such maintenance processors and the compilation of error data by units connected to a system bus attention may be directed to the U.S. Patents to Wilber et al., U.S. Pat. No. 3,921,141, Hopkins et al., U.S. Pat. No. 3,015,246, Kaminski et al., U.S. Pat. No. 4,176,394, Huettner et al., U.S. Pat. No. 3,810,120, and Getson et al., U.S. Pat. No. 4,159,534. Unfortunately, conventional approaches to error reporting usually involve the assembly of a separate error message containing prescribed address and data segments for transmission to the maintenance processor. As such, system complexity is increased and error reporting speed suffers due to the need for an intermediate message handling scheme.

SUMMARY OF THE INVENTION

In accordance with the present invention, there is provided an error reporting scheme that greatly simplifies the manner in which errors are reported to the maintenance processor by taking advantage of system addressing capability provided in that portion of the system which normally handles message routing housekeeping routines. Specifically, in accordance with the present invention, the system's arbitration message routing functions are employed to advise the maintenance processor of errors. By necessity, a system's arbitration unit (or arbiter) knows the identity and location of all potential users of the system's communication network, and, for controlling message exchange priorities among the users, it commonly contains logical-physical and physical-logical address translation tables for routing messages among the cards on the backplane or even between backplanes.

Each logical-physical address translation table is coupled between a destination logical address bus and contains physical address lines respectively connected to the individual cards or modules on the backplane. Among the modules is the maintenance processor module and, of course, the arbiter module itself. The arbiter module also contains a physical address-source logical address table having individual input or communication request lines coupled from the respective modules on the backplane and output logical address lines forming the logical source address link portion of the address bus.

In the event of an error, the module which detects the error immediately terminates its present operation and, after gaining access to the communication bus, reports the error to the arbiter. In so doing, the error reporting module sets an error bit on an error signal line that forms part of the command bus. When the arbiter sees the error bit line set, it ignores the destination address produced by the logical-physical address table which identifies the other participant (destination module) in the transfer in which the error arose, and, instead, substitutes the physical address of the maintenance processor as the intended recipient of the transfer. When the maintenance processor sees its physical address line set, it can proceed to analyze the error report. Since the identities of the source and destination addresses of the participants in the transfer in which the error arose are defined by the contents of the source and destination portions of the address bus, the maintenance processor merely needs to read these buses to learn the location of each module participating in the error transfer. This simple adjunct to the arbitration/routing scheme permits the maintenance processor to easily and rapidly obtain a large amount of information concerning the error transfer, whereby system corrective action can be expedited.

DETAILED DESCRIPTION

Figure 1:
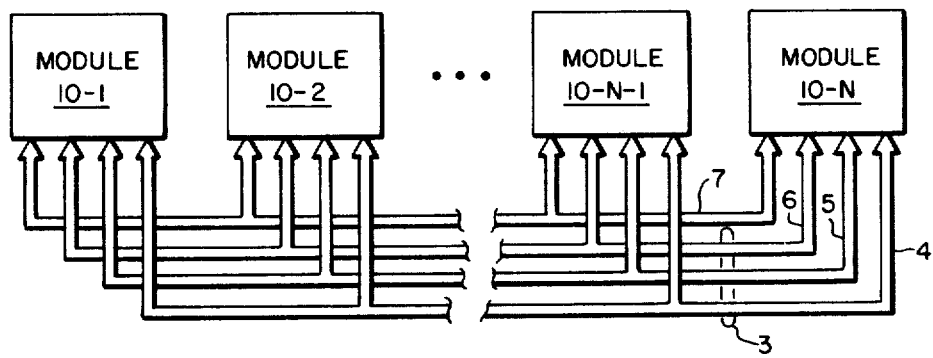
FIG. 1 is a general block diagram of a distributed communication network in which the error reporting scheme of the present invention is incorporated.

Before describing, in detail, the particular improved error reporting scheme in accordance with the present invention, it should be observed that the present invention resides primarily in a novel structural combination of conventional computer circuits, and not in the particular detailed configurations thereof. Accordingly, the structure, control and arrangement of such conventional computer circuits have been illustrated in the drawings by readily understandable block representations, which show only those specific details that are pertinent to an understanding of the present invention, so as not to obscure the disclosure with structural and circuitry details which will be readily apparent to those skilled in the art having the benefit of the description herein. Moreover, various control lines within the electronic data processing system have been appropriately consolidated and simplified in order to emphasize those portions that are most pertinent to the present invention. Thus, the block diagram illustration of the invention does not necessarily represent the mechanical structural arrangement of the exemplary system, but is primarily intended to illustrate the major structural components of the system in a convenient functional grouping, whereby the present invention may be more readily understood.

Referring now to FIG. 1 of the drawings, there is shown a typical configuration of a distributed data communication network within a data processing environment. The network includes a distributed communication bus 3 shared in common by a plurality of users or modules 10-1 . . . 10-N. These modules may be considered to be the modules of which a processor backplane is comprised. In a multi-backplane network, the individual backplanes will be interconnected through their respective ports. For purposes of the present description, in order to simplify the explanation and illustration, reference will be made, for the most part, to the case of an individual backplane.

The backplane contains N slots in which a corresponding plurality of modules 10-1 . . . 10-N are inserted. The communication bus 3 over which the modules exchange messages with one another includes an address bus portion 4, a data bus portion 5 and a command bus portion 6. Also provided in the backplane is an arbitration/routing control link 7 which contains a plurality of individual request and select lines through which the arbiter/routing module handles requests for communications and grants access to the bus.

As is shown in FIG. 1, one of the modules, in the illustration module 10-N-1, is an arbiter/routing module, while another of the modules, e.g. module 10-N, contains the maintenance processor.

Figure 2:
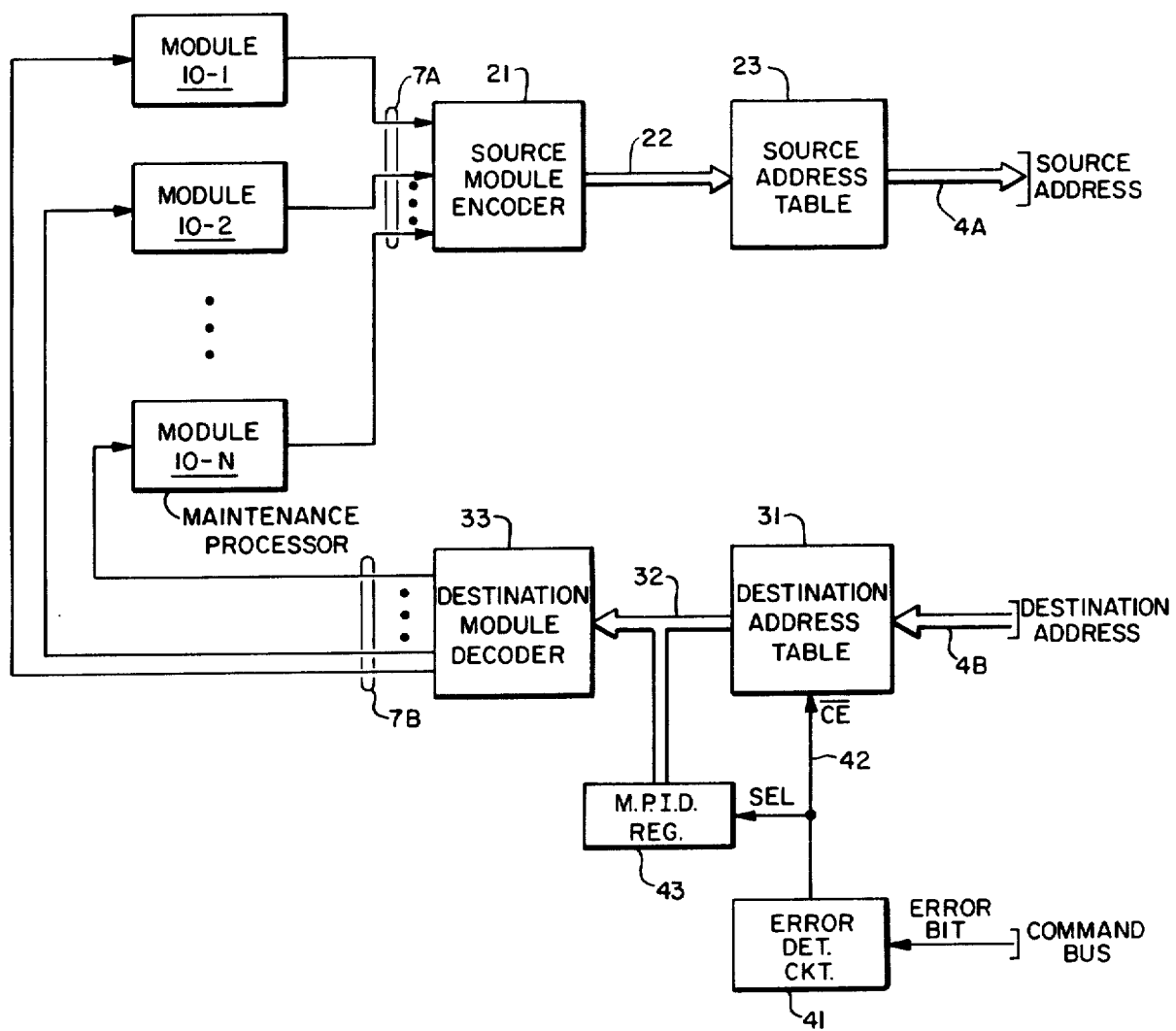
FIG. 2 is a schematic block diagram of the error report routing scheme employed in accordance with the present invention.

Referring now to FIG. 2, a more detailed schematic block diagram of the constituents of the arbiter/routing module employed in accordance with the present invention will be described. It should be noted here that an understanding of the details of the arbitration scheme in accordance with which the arbiter operates is not necessary for an understanding of the present invention and, accordingly such details have been omitted from FIG. 2 in order to simplify the drawing. However, its basic operation will be described here in order to provide a more full appreciation of the operation of FIG. 2 to be described below.

The backplane arbiter/router module includes arbitration circuitry (not shown in FIG. 2) which controls the acceptance and delivery of backplane communication requests from the modules and routing circuitry (shown in FIG. 2) for directing messages among the modules on the backplane. Arbitration among a plurality of requests is carried out in accordance with prescribed priority scheme, such as a multiple ring priority scheme in which plural rings are prioritized according to respective levels of communication urgency. The higher priority may be assigned, for examle, to memory read return requests, whereas the lowest priority may be assigned to a processor. When a plurality of requests from different priority rings are presented to the arbiter, the arbiter closes the rings to prevent further requests from entering the rings and then proceeds to handle the requests from the highest priority ring to the lowest priority ring, and in accordance with a priority scheme assigned to each particular ring. Usually, the slot positions in the backplane represent the priority of the modules and, for keeping track of the modules, the arbiter contains source and destination address tables, to be referenced below, that permit the arbiter to translate a physical address to a logical address and a logical module address to one of a plurality of physical addresses in its particular backplane. For a more detailed disclosure of a multiple ring type arbitration scheme per se, attention may be directed to the descriptions of the schemes in U.S. Patents to Adams et al., U.S. Pat. No. 3,543,242 and Adams, U.S. Pat. No. 3,543,246.

It should be observed, however, that the above-referenced arbitration scheme is not the only type of arbitration scheme to which the present invention has applicability, but is one which is advantageously employed in present-day data processing systems. For additional disclosures of prioritization schemes and module-slot assignment arrangements, which will not be described in detail here, attention may be directed to the U.S. Patents to Bardotti et al., U.S. Pat. No. 3,925,766, Albright, U.S. Pat. No. 3,800,287, and Duke et al., U.S. Pat. No. 4,128,883.

Referring now to FIG. 2, wherein the routing-error reporting portion of the arbiter to which the present invention is particularly directed is shown, the address portion 4 of the communication bus 3 of FIG. 1 is illustrated as being segmented or divided into two portions, respectively identified as a source bus link 4A and a destination bus link 4B. Each of these links carries the logical address of a module to which or from which a communication or message transfer within the system is to take place. The source bus link carries the identity, i.e. the logical address, of the message originating module while the destination bus 4B carries the logical address of the module for whom the communication is intended. The designation bus link 4B is coupled to a slot address table 31 which converts the logical address code on link 4B into a physical address identifying a particular module in the backplane. Destination address table 31 is typically configured of a plurality of random access memories (RAMs) which are loaded with a logical-physical address table by software. The output of destination address table 31 is a physical address link 32 coupled to the input of a destination module decoder 33. Assuming, for example, that the computer system may include a plurality of backplanes each containing a plurality of modules, with an address capability of 1K (1024) addresses, then the destination and source address portions may be ten bits wide. Letting each backplane contain up to sixteen modules, then destination address table would be a 10×4 RAM for converting a ten bit logical address to a four bit physical address. The destination module decoder 33 decodes the four bit physical address 32 and provides an output on one of a plurality of individual destination select lines 7B which are coupled to modules 10-1 . . . 10-N, as shown. It is again to be noted here that the arbiter itself constitutes one of the modules so that the select line for this particular module would be considered an internal selection link.

Also coupled to physical address link 32 is the output of a maintenance processor identifier register 43, which contains the physical address of the maintenance processor and is selectively enabled in response to an output produced by an error code logic detection circuit 41 on link 42. Logic circuit 41 is coupled to an error bit line portion of the command bus 6. As explained above in connection with the brief description of the invention, when a module detects an error in the course of a transfer, it aborts the communication and then sets the error bit portion of the communication bus. This setting of the error bit is detected by logic ciruit 41 within the arbiter/routing module. When the logic circuit 41 detects the error bit, it disables the chip enable control input for the slot address table 31 and places the maintenance processor identifier code (its physical address) stored within register 43 on physical address link 32.

For originating communication requests, each of the modules 10-1 . . . 10-N includes an individual source request line of which the source request link 7A is comprised. These lines are coupled to a select line-physical address encoder 21, the output of which is coupled over link 22 to a source module address table 23. Like destination module address table 31, source module address table 23 may be comprised of a plurality of RAMs. This table converts the physical address provided from encoder 21 on link 22 into a multibit logical address to be coupled over the source bus link 4A of the address bus portion 4 of the communication bus 3.

Operation

Considering now the operation of the error reporting scheme of the present invention, let it be assumed that module 10-1 is to transfer a message to another module on the backplane, for example, module 10-2.

It will be assumed that the initial process of requesting access to the bus from the module to the arbiter, the clearing of contentions for the bus by the arbiter, and the eventual granting of access to the bus by the arbiter to the requesting module have taken place. Again, as noted above, the details of the arbitration scheme, per se, will not be described here in order to more concisely focus upon the error reporting scheme of the present invention. For more detailed explanation of the above-referenced type of arbitration scenario that may be carried out prior to the communication, attention may be directed to the above-referenced patents or other literature dealing with arbitration schemes with which those skilled in the art are familiar. It will be simply noted here, that in the course of gaining access to the bus, module 10-1 will have submitted a request over its indivudual one of request lines 7A to the request line physical address encoder 21 so that the source module address table 23 will have provided on link 4A the logical address of the requesting module 10-1. Similarly, module 10-1 will have caused to be placed on the destination bus 4B the logical address of the intended recipient of the communication, namely, the logical address of module 10-2, so that destination module address table 10-2 will have, at its input link 4B, the logical address of the destination module 10-2.

Now let it be assumed that there is an error in the transfer, and that module 10-1 detects the error and thereby aborts the communication. Module 10-1 then proceeds to set the error bit on the command bus 6, which is delivered to logical circuit 41 within the arbiter. In response to detecting this error bit having been set, logic circuit 41 changes the state of output line 42 to disable the chip enable input to destination address table RAMs 31, so that the destination logical address of link 4B does not produce a physical address corresponding to this logical address on output link 32 from destination address table 31. Instead, logic circuit 41 causes the address of the maintenance processor, namely, its physical address in the backplane, which is stored in maintenance processor identification register 43, to be coupled over link 32 to the destination module address decoder 33. Decoder 33 drives the select line to the maintenance processor 10-N, so as to route the message from module 10-1 directly to the maintenance processor. The maintenance processor may now quickly be advised of the error report, including the participants in the aborted communication by simply observing the communication bus 3. The command bus indicates the error report, data indicating the type of error may be provided on the data bus portion itself, while the participants in the aborted or erroneous transfer are readily identified by simply reading the logical addresses on the source bus 4A and the destination bus 4B. Namely, it is not necessary for the aborting module to identify the maintenance processor as the intended recipient of the communication. This action is conducted automatically by the arbiter-routing module simply by the provision of a single error bit on the command bus and the use of the maintenance processor identifier register 43. Data which immediately identifies the opposite ends (the transmitting and receiving modules) in the erroneous communication transfer is immediately available to the maintenance processor simply by reading the source and address portions of the address bus. This greatly reduces the communication time, and moreover, in the event of a problem with the actual setting up of a communication with one of the participants in the erroneous transfer, such problem will not occur with the report to the maintenance processor, since the maintenance processor is directly advised of the error through the arbiter-routing module. As a result, an error in the addressing mechanism will not prevent the transmission of an error report to the maintenance processor.

While I have shown and described an embodiment in accordance with the present invention, it is understood that the same is not limited thereto but is susceptible to numerous changes and modifications as known to those skilled in the art and I therefore do not wish to be limited to the details shown and described herein but intend to cover all such changes and modifications as are encompassed by the scope of the appended claims.

What is claimed is:

1. For use in a data communications system wherein a plurality of modules are coupled to a communication bus, an arrangement for reporting an error in the course of a communication between modules comprising:

first means, coupled to an address portion of said bus, for normally routing a message to a module whose identification is defined by contents of said address portion of said bus; and second means, coupled to said first means and responsive to the occurrence of a prescribed error condition in the course of communication between modules, for modifying the normal routing operation of said first means and, in its place, causing said first means to route a message to a preselected one of said modules irrespective of the identity of the module defined by the contents of said address portion of said bus.

2. An arrangement according to claim 1, wherein said prescribed error condition corresponds to the occurrence of an error during a message transfer between modules as detected by one of said modules.

3. An arrangement according to claim 2, wherein said address portion of said bus includes a first portion the contents of which identify the module detecting the occurrence of said error and a second portion the contents of which identify the other module involved in the communication in which the error has occurred.

4. An arrangement according to claim 3, wherein said communications bus includes a command portion and wherein said second means includes means, responsive to a prescribed signal placed on said command portion by said detecting module, for modifying said normal routing operation of said first means and causing said first means to route a message to said preselected one of said modules.

5. An arrangement according to claim 4, wherein said preselected one of said modules comprises a maintenance unit to which errors occurring during the operation of said system are reported for error processing.

6. An arrangement according to claim 5, wherein said second means includes logical-physical address conversion means for converting a logical address on said second portion of said address portion of said bus into a physical address associated with one of said modules;

means for storing a code representative of the physical address of said maintenance unit; and decoding means, coupled to said conversion means and said storing means, for selectively coupling a module selection signal to a module whose physical address is defined by the output of one of said conversion means and said storing means.

7. An arrangement according to claim 6, wherein said second means further includes means, responsive to said prescribed signal on said command portion of said bus, for decoupling the output of said conversion means from said decoding means and for supplying the content of said storing means to said decoding means.

8. An arrangement according to claim 1, wherein said preselected one of said modules comprises a maintenance unit to which errors occurring during the operation of said system are reported for error processing.

9. For use in a data processor communications system wherein a plurality of modules are coupled to a communication bus, one of said modules comprising a maintenance processor, and another of said modules comprises an arbitration unit through the operation of which messages among modules are selectively routed, an arrangement for reporting an error to said maintenance processor in the course of a communication between modules comprising, within said arbitration unit:

first means, coupled to an address portion of said bus, for normally causing a message to be routed to an intended destination module whose identification is defined by contents of said address portion of said bus; and second means, coupled to said first means and responsive to the occurrence of an error during a message transfer between modules, for modifying the normal routing operation of said first means and causing said first means to route a message to said maintenance processor.

10. An arrangement according to claim 9, wherein said address portion of said bus includes a first portion the contents of which identify the module detecting the occurrence of said error and a second portion the contents of which identify the other module involved in the communication which the error has occurred.

11. An arrangement according to claim 10, wherein said communications bus includes a command portion and wherein said second means includes means, responsive to a prescribed signal placed on said command portions by said detecting module, for modifying said normal routing operation of said first means and causing said first means to route a message to said maintenance processor.

12. An arrangement according to claim 11, wherein said second means includes logical-physical address conversion means for converting a logical address on said second portion of said address portion of said bus into a physical address associated with one of said modules;

means for storing a code representative of the physical address of said maintenance unit; and decoding means, coupled to said conversion means and said storing means, for selectively coupling a module selection signal to a module whose physical address is defined by the output of one of said conversion means and said storing means.

13. An arrangement according to claim 12, wherein said second means further includes means, responsive to said prescribed signal on said command portion of said bus, for decoupling the output of said conversion means from said decoding means and for supplying the content of said storing means to said decoding means.

14. An arrangement according to claim 11, wherein said arbitration unit includes encoding means, coupled to said modules, for selectively generating a physical address representative of the identification of said error detecting module; and physical-logical address conversion means, coupled to said encoding means, for providing a logical address on said first portion of said bus representative of the identification of said error detecting module;

whereby, in response to the operation of said second means routing a message to said maintenance processor, said maintenance processor may obtain the identifications of the modules involved in the communication in which said error has arisen by reading said first and second portions of the address portion of said communications bus.

* * * * *